ис008727235B2

(12) United States Patent
Nunes (10) Patent No.: US 8,727,235 B2
(45) Date of Patent: May 20, 2014

(54) APPARATUS FOR DISPERSING A SUBSTANCE OVER A LARGE AREA

(76) Inventor: Leno Ambrosio Nunes, Visalia, CA (US)

( * ) Notice: Subject to any disclaimer, the term of this patent is extended or adjusted under 35 U.S.C. 154(b) by 785 days.

(21) Appl. No.: 12/854,121

(22) Filed: Aug. 10, 2010

(65) Prior Publication Data

US 2011/0036926 A1 Feb. 17, 2011

Related U.S. Application Data (60) Provisional application No. 61/233,111, filed on Aug. 11, 2009.

(51) Int. Cl.
*B05B 9/06* (2006.01)
(52) U.S. Cl.
USPC .............................................. 239/77; 239/381
(58) Field of Classification Search
CPC ...................................................... A01G 13/06
USPC .............. 239/77, 380, 381, 383, 389, 214.13, 239/451, 462; 169/91, 52
See application file for complete search history.

(56) References Cited

U.S. PATENT DOCUMENTS

| | | | | |
|---|---|---|---|---|
| 2,884,075 A | * | 4/1959 | Poon | 169/48 |
| 3,782,026 A | * | 1/1974 | Bridges et al. | 43/124 |
| 5,037,029 A | * | 8/1991 | Garet et al. | 239/77 |
| 5,205,711 A | * | 4/1993 | Raczykowski | 416/63 |
| 6,578,828 B2 | | 6/2003 | Terrell et al. | |
| 6,675,739 B2 | | 1/2004 | Terrell et al. | |
| 6,705,599 B2 | | 3/2004 | Terrell et al. | |
| 6,883,251 B2 | | 4/2005 | Terrell et al. | |
| 7,306,045 B1 | * | 12/2007 | Moflihi | 169/70 |
| 2004/0261632 A1 | * | 12/2004 | Hansen et al. | 99/468 |
| 2007/0186778 A1 | * | 8/2007 | Peterson | 96/281 |

OTHER PUBLICATIONS

Ledebuhr Industries Proptec Dual-Stage Atomizers, Internet, 2009, US.
Super PoleCat Evaporator, Internet, 2009, US.

\* cited by examiner

*Primary Examiner* — Davis Hwu
(74) *Attorney, Agent, or Firm* — Richard A. Ryan

(57) ABSTRACT

An apparatus for dispersing a spray mist over a large area that cools or provides other benefits to the area or to people and animals in the area. The dispersing apparatus comprises a ducted fan having a shroud with a plurality of fan blades disposed inside the shroud near its intake end and a rotary atomizer positioned inside the shroud towards its discharge end and in the air stream created by the fan blades. The fan blades are powered by a motor inside the shroud. A tilting mechanism tilts the discharge end of the shroud up or down to aim the spray mist and an oscillating mechanism pivots the ducted fan to discharge the spray mist generally across the area. The rotary atomizer discharges an atomized substance, which may be water, pesticide, deodorant, liquid fuel, fire retardant or a wide variety of other materials, into the air stream.

10 Claims, 5 Drawing Sheets

APPARATUS FOR DISPERSING A SUBSTANCE OVER A LARGE AREA

CROSS-REFERENCE TO RELATED APPLICATIONS

This patent application claims priority to U.S. Provisional Patent Application No. 61/233,111 filed Aug. 11, 2009.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to apparatuses and systems for dispersing a substance, such as water or various chemicals, over an area where application of such substance is believed to be beneficial. In particular, the present invention relates to such dispersing apparatuses and systems that are configured to effectively and efficiently disperse a substance over a large area. Even more particularly, this invention relates to such apparatuses and systems that utilize rotary atomizers and fans to disperse the substance.

B. Background

As generally well known, there is often a need to disperse a substance over an area to benefit persons, animals or plants in the area, to treat the land or crops growing on the land or to achieve other beneficial objectives. For instance, at a gathering of people in an outdoor area during warm or hot weather, it is well known to disperse water, in the form of a mist, over the area to cool the people who are at least generally in the sprayed area. Such systems are commonly utilized at outdoor restaurants, concerts and like outdoor gatherings. Substance dispersing systems are also utilized by those in the business of raising animals and crops. For instance, those in the business of raising milk cows know that higher ambient air temperatures generally reduce the production efficiency of the cows. Because it is usually neither practical nor economic to maintain the cows in an air conditioned facility, during the summer months milk cows are substantially exposed to the hot ambient air temperatures. Shading and various cooling devices and systems are utilized in an attempt to cool the cows and maintain the desired level of milk production. Horses and other animals also benefit from efforts to keep them cool during hot weather. Plants, particularly crops, also benefit from attempts to maintain their temperature in a more desirable range so as to prevent exposing the plants to freezing or very hot temperatures.

In addition to attempting to regulate or at least partially control the air temperature, substances are dispersed in an area to accomplish other objectives. For instance, the area where animals are raised or where they otherwise reside benefits from the dispersion of substances to kill flies and other pests and/or substances that can reduce the odor associated with the animals. Crops and other plants benefit from the dispersion of pesticides, nutrients and/or other beneficial substances onto the plants, on the ground where the plants grow or in the general area of the plants. Water and other fluids are commonly dispersed in construction sites or other dusty areas as a means of dust control. Areas also benefit from the dispersion of fire suppression substances either in anticipation of an approaching fire or to control a fire that is burning. Urban areas are known to benefit from the dispersion of antiviral agents and/or substances for controlling mosquitos, flies or other pests. Numerous other substances can be dispersed in an area to achieve certain, usually specific, benefits.

The use of a dispersing apparatus to disperse a substance over an area is generally well known. Outdoor areas where people gather commonly use misting apparatuses to disperse a very fine mist of water to cool the ambient air temperature. Ideally, such apparatuses are configured such that the mist is so fine that it substantially evaporates in the air before it contacts persons in the area to prevent those persons from getting wet. A common configuration for a misting apparatus comprises a source of pressurized water that is directed through a spray nozzle. To achieve the desired fine mist, a pump or other pressurizing device is utilized to pressurize the water and the nozzle is configured with a discharge that results in the fine spray. In addition to the requirement to pressurize the fluid, the water or other fluid that is used for the mist must be very clean, often filtered, to avoid clogging or damaging the spray nozzle. Due to the requirement of having a very clean, non-clogging fluid, most conventional mist sprayers are not suitable for dispersing substances other than water or substances that are completely soluble in water or other liquid. Conventional misting apparatuses are also not suitable for dispersing a substance over a large area, such as an area where cows are being raised, a large group of people are gathering or where crops or other plants are being grown. Use of such systems would require significant initial and ongoing costs to purchase a large volume of misters, pressurize the fluid and clean and/or replace nozzles as they become clogged.

One prior art livestock cooling apparatus, described in U.S. Pat. No. 6,705,599 to Terrell, et al., comprises an electrically-powered fan having a fan blade and fan motor mounted in a fan enclosure which is attached to a fan yoke that allows the user to change the angle of the fan enclosure and, as a result, the direction of the air stream created by the fan. The fan yoke connects to a drive shaft supported within a bearing means that is attached to a support means, which may be a structural member of a livestock protective structure, such as a barn or shade structure. The patent also describes use of a mist ring, which has a plurality of nozzles attached thereto, at the front or discharge opening of the fan enclosure for injecting water droplets into the air stream of the fan. A pump, connected to a pump motor, provides pressurized water to the nozzles that can result in a drench, mist or fog. The patent discloses the benefit of using very small diameter nozzles and supplying the water at high pressure to obtain extremely small water particles that results in cool animals with little wetting of the animal's hair-coat and virtually no wetting of the animal's bedding. U.S. Pat. Nos. 6,578,828, 6,675,739 and 6,883,251, each also to Terrell, et al., disclose livestock cooling systems that utilize the above-described cooling apparatus. As with the misting apparatuses, the cooling apparatus and systems of the aforementioned patents require high pressure pumps and small diameter nozzle openings and, as such, they are likely to have the same issues with regard to costs and clogging and being limited to spraying substantially pure water or other liquids or substances that are completely soluble in water or other liquid.

Improved sprayers and associated spraying systems for dispersing a fluid over a relatively large area have been developed and are in use. One such apparatus is the SMI® Polecat Evaporator available from SMI Evaporative Solutions of Midland, Michigan, which are commonly, but not exclusively, utilized to throw a water spray for producing snow or to evaporate away unwanted water. These and similarly configured sprayers atomize water for the spray with a plurality of nozzles, such as thirty such nozzles, at the discharge end of a powerful spray mechanism that is capable of throwing a spray over 200 feet from the discharge end of the apparatus. The nozzles are configured to introduce the atomized substance into the air stream created by the spray mechanism. As such, this type of sprayer requires a pump to supply pressurized fluid, such as an optimum operating pressure between 80 and 100 psi, to the apparatus. To avoid plugging the nozzles, such sprayers are typically used with one or more water filters to filter the water prior to the nozzles. For purposes of attempting to cool a large area, such as an area where cows, other animals or people are located, these sprayers have certain disadvantages, namely spraying too much water, plugging of the nozzles and requiring a pump and filter.

Another mechanism for atomizing water is a rotary atomizer, such as available from Ledebuhr Industries, Inc. out of Williamston, Mich. In general, rotary atomizers utilize have a two-stage atomizing process. Fluid enters the atomizer and is spun around the inside of the atomizer basket and then discharged out the atomizer through a holes on the side of the basket. The typical rotary atomizer does not require pressurized fluid, thereby eliminating the need for a pump, and does not have any nozzles that can be plugged, thereby generally eliminating the need to pre-filter the fluid. Another benefit of rotary atomizers is that they are typically better suited to atomizing substances which are not completely soluble.

What is needed is an improved apparatus for dispersing a substance over a large area. Preferably, such an apparatus should be configured to efficiently and effectively spray a substance over a large area to affect the temperature of the area, treat the area or otherwise beneficially affect the area. A preferred apparatus will not require the use of pumps to pressurize the fluid and will not have nozzles that are subject to clogging, thereby eliminating most filtering requirements. The preferred apparatus should be relatively inexpensive to manufacture, relatively easy to operate and be suitable for use in typical outdoor environments.

SUMMARY OF THE INVENTION

The dispersing apparatus of the present invention provides the benefits and solves the problems identified above. That is to say, the present invention discloses an improved apparatus for dispersing a substance over a large area, such as dispersing a cooling fluid over an area where people are gathered or where cows or other animals are located. The dispersing apparatus of the present invention can be utilized to disperse a wide variety of substances over areas where it is beneficial for people, animals, plants or the land itself. The present apparatus does not require the use of a high pressure fluid and does not use any nozzles, thereby eliminating, in most applications, the need for a high pressure pump and a filtration system. The dispersing apparatus of the present invention can be manufactured with readily available components, is easy to use and is suitable for most outdoor environments. In one embodiment, the dispersing apparatus of the present invention is particularly adaptable for use to spray water or other liquids over a stockyard or other large outdoor or indoor area where cattle or other animals are kept.

In a primary embodiment of the present invention, the dispersing apparatus generally comprises a ducted fan configured to create a strong air stream and a rotary atomizer configured to atomize a fluid and discharge the atomized fluid into the air stream so that it may be blown over and across a large area to cool, heat or provide other benefits to the area or to people and animals in the area. The ducted fan has a shroud with an intake end and a discharge end, a plurality of fan blades that are rotatably disposed in the shroud generally towards the intake end thereof and a motor that is operatively connected to the fan blades. The fan blades are configured to draw air into the shroud and produce an air stream that flows toward the discharge end of the shroud. The motor is connected to a source of power, such as an electrical panel or other source of electricity. The rotary atomizer is disposed inside the shroud generally towards the discharge end thereof and in fluid flow communication with the air stream. One or more conduits hydraulically connect the rotary atomizer to a source of fluid. The rotary atomizer is configured to discharge atomized fluid from the source of fluid into the air steam so as to produce a spray mist that is discharged generally over the large area. In a preferred embodiment, the dispersing apparatus has a tilting mechanism for tilting the ducted fan so as to vertically direct the discharge end of the shroud towards the large area and generally discharge the spray mist over the large area. The tilting mechanism can comprise a lever or like device operatively connected to the shroud so the user can manually tilt the shroud up or down to best achieve the coverage over the large area he or she desires. The preferred embodiment of the dispersing apparatus also includes an oscillating mechanism for oscillating the ducted fan in a generally left and right or back and forth direction. The oscillating mechanism is operatively connected to the shroud so as to sweep the discharge end of the shroud towards the large area and generally discharge the mist across the large area. The oscillating mechanism can comprise a motor connected to the source of power and a gear assembly that is operatively connected to each of the motor and the ducted fan. One or more brace members can be utilized to interconnect the rotary atomizer with an inner surface of the shroud to support the rotary atomizer inside the shroud. Preferably, the one or more brace members are configured to dispose the rotary atomizer in spaced apart relation to the inner surface of the shroud. The preferred dispersing apparatus also includes a screen at the intake end of the shroud to prevent large debris from damaging the fan blades or other equipment inside the shroud and to protect persons from being injured by the rotating fan blades. The screen must comprise a plurality of openings to allow the fan blades to draw sufficient air into the shroud to provide the desired dispersing of the spray mist.

Accordingly, the primary aspect of the present invention is to provide an improved apparatus for dispersing a substance over a large area that has the advantages discussed above and which overcomes the various disadvantages and limitations associated with prior art substance dispersing apparatuses.

It is an important aspect of the present invention to provide a dispersing apparatus that is configured to disperse a substance over a large area without requiring the substance to be pressurized and injected into an air stream through a plurality of nozzles.

It is also an important aspect of the present invention to provide a dispersing apparatus that is particularly configured to be used outside to disperse a substance of a relatively large area without being clogged by dirt, dust or other debris commonly found in outdoor environments.

It is also an important aspect of the present invention to provide a dispersing apparatus that is capable of dispersing a wide variety of substances over relatively large areas where the substance can benefit people, animals, plants or the land itself.

It is also an important aspect of the present invention to provide a dispersing apparatus that can be used to disperse cooling fluids, pesticides, deodorants, heated air and other substances over a relatively larger area.

Another important aspect of the present invention is to provide a dispersing apparatus that is readily adaptable for use to spray water, other liquids and/or various solids dissolved in liquids.

Yet another important aspect of the present invention is to provide a dispersing apparatus that is relatively inexpensive to manufacture, relatively easy to operate and suitable for use in typical outdoor environments, including areas where cattle or other animals are kept.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention.

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show certain shapes and configurations for the fan mechanism and rotary atomizer, those skilled in the art will understand that this is merely for purposes of simplifying this disclosure and that the present invention is not so limited.

A dispersing apparatus that is configured pursuant to a preferred embodiment of the present invention is shown generally as 10 in FIGS. 1 through 4. The dispersing apparatus 10 generally comprises a ducted fan 12 and a rotary atomizer 14 for introducing an atomized substance into the air stream 15 created by the ducted fan 12 to produce a very fine spray, such as the spray mist shown as 16 in FIGS. 1 through 3, that can be dispersed over a relatively large area, shown as 17 in FIG. 7. In a preferred embodiment, ducted fan 12 comprises an elongated shroud 18 having a first or air intake end 20 and a second or discharge end 22. The embodiments shown in the figures and discussed below utilize ducted fan 12 having a shroud 18 with a bell-shaped intake end 20 housing the fan blades 24, best shown in FIG. 4, with a generally round tubular discharge end 22. Rotatably mounted inside the shroud 18 are, preferably, a plurality of fan blades 24, best shown in FIG. 4, that are sized and configured to draw air in through the intake end 20 and direct air out the discharge end 22 of shroud 18. As will be readily apparent to those skilled in the art, the above-described configuration for shroud 18 is not required for the operation of dispersing apparatus 10 and modifications to the shape of shroud 18 can be made as desired by the manufacturer and/or user of dispersing apparatus 10. As well known, the shroud 18 of ducted fan 12 is preferably configured to reduce losses in discharge volume and pressure (e.g., thrust if ducted fan 12 were used for propulsion). By varying the cross-section of shroud 18, the velocity and pressure of the airflow out discharge end 22 can be varied as desired by the manufacturer or user of dispersing apparatus 10 to meet particular dispersing requirements.

Figure 1:
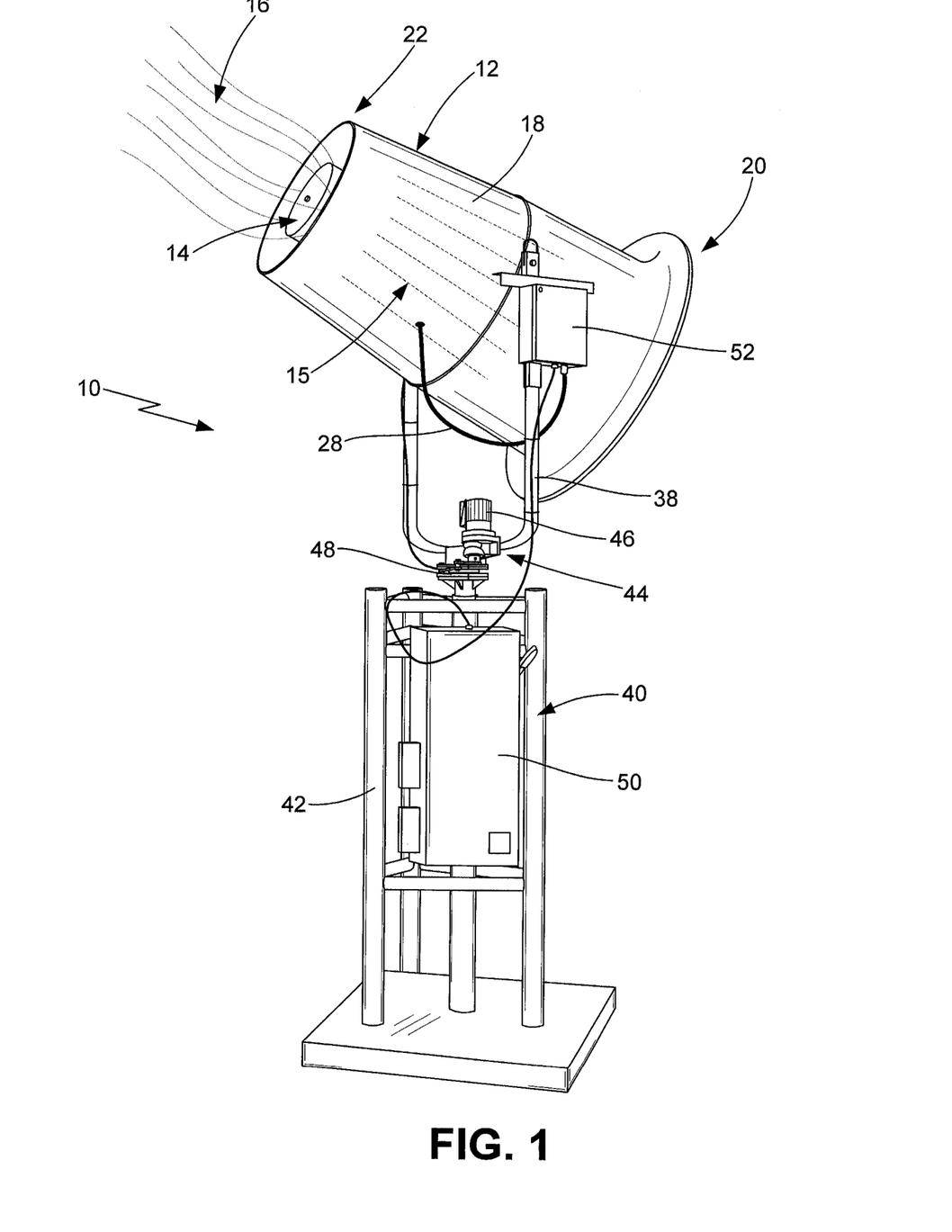
FIG. 1 is a left side perspective view of an apparatus for dispersing a substance over a large area configured according to a preferred embodiment of the present invention shown dispersing a substance.

In the preferred embodiment of the present invention, the fan blades 24 of ducted fan 12 are operatively connected to a fan motor 26, which can be an electric or hydraulic motor, and are configured to move a relatively large volume of air through the interior of shroud 18. Specifically, the fan blades 24 are configured to draw air in through the intake end 20 of shroud 18 and direct a powerful stream of air out through the discharge end 22 thereof. The configuration of fan blades 24 necessary to achieve movement of large quantity of air through shroud 18 and their relationship to a shroud or duct, such as shroud 18, is generally well known within the art. Typically, but not exclusively, the fan motor 26 for ducted fan 12 will be fixedly mounted inside the shroud 18, as shown in FIG. 4. In one embodiment, the fan motor 26 for ducted fan 12 is a 25 hp electric motor connected to a source of electricity by wire(s) 28, as best shown in FIGS. 1 through 3.

Figure 2:
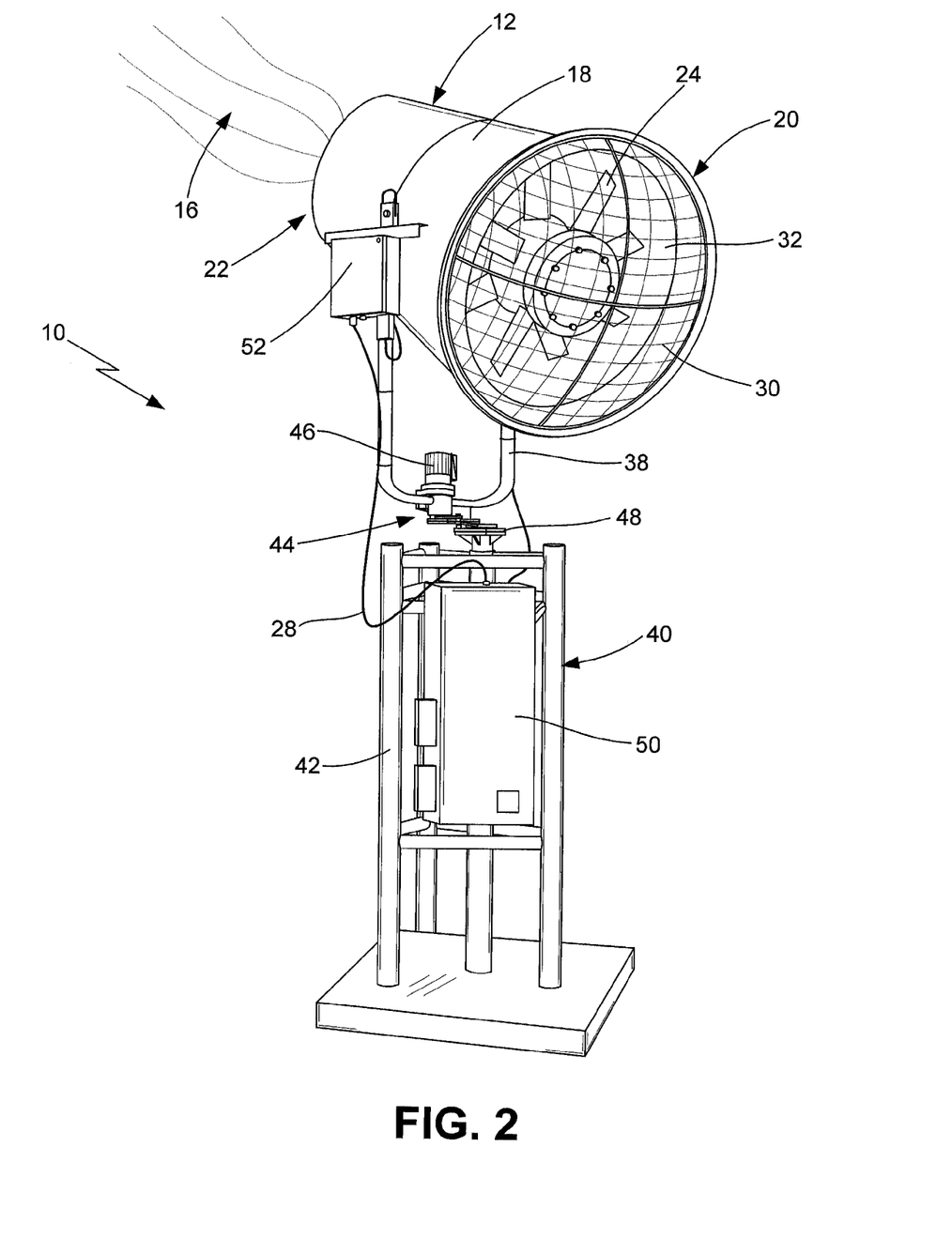
FIG. 2 is a back perspective view of the first or intake end of the apparatus of FIG. 1.

For use in outdoor environments, such as corrals, pens and other animal holding areas, intake end 20 of shroud 18 will generally have a screen 30, shown in FIGS. 2 and 4, that substantially covers intake end 20 and is configured to prevent larger-sized debris being drawn into the shroud 18 and damaging fan blades 24 and/or other equipment inside shroud 18. In addition, the screen 30 will prevent people from contacting fan blades 24 during operation of dispersing apparatus 10, which would likely cause severe injury. However, the screen 30 should have sufficient number of appropriately sized openings 32 so the screen 30 does not significantly interfere with the ability of fan blades 24 to draw air into shroud 18 through intake end 20. In one embodiment, screen 30 comprises is a metal mesh or mesh-like configured structure that defines a plurality of openings 32, as best shown in FIGS. 2 and 4, through which air will be drawn into shroud 18 by fan blades 24. If desired, various other materials and configurations of screen 30 can be utilized.

Figure 3:
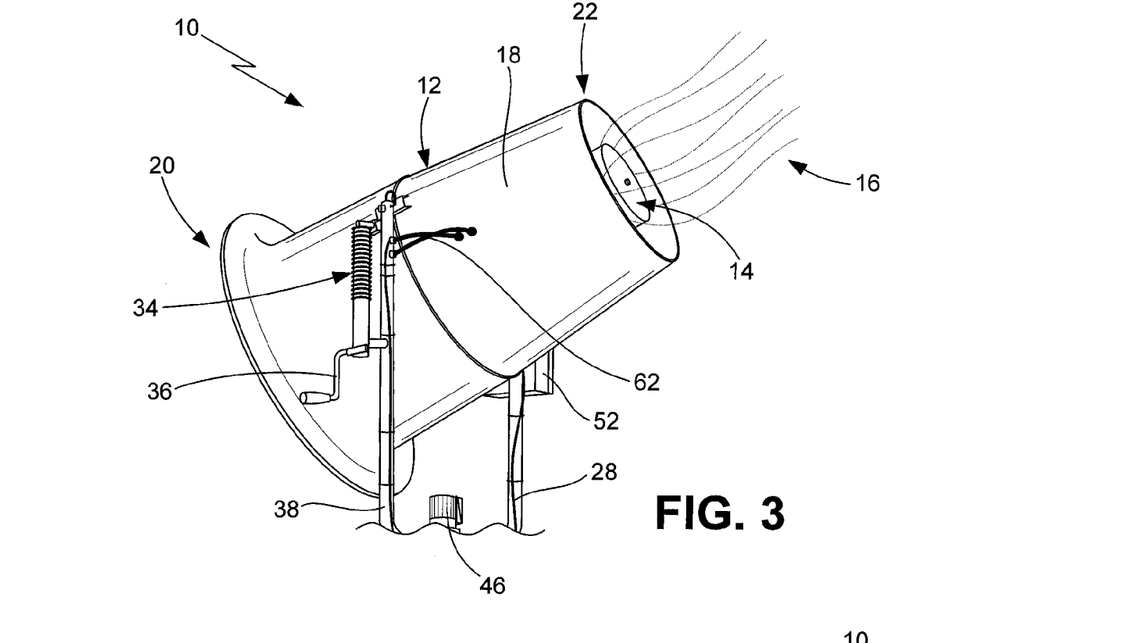
FIG. 3 is a right side perspective view of the apparatus of FIG. 1.
Figure 4:
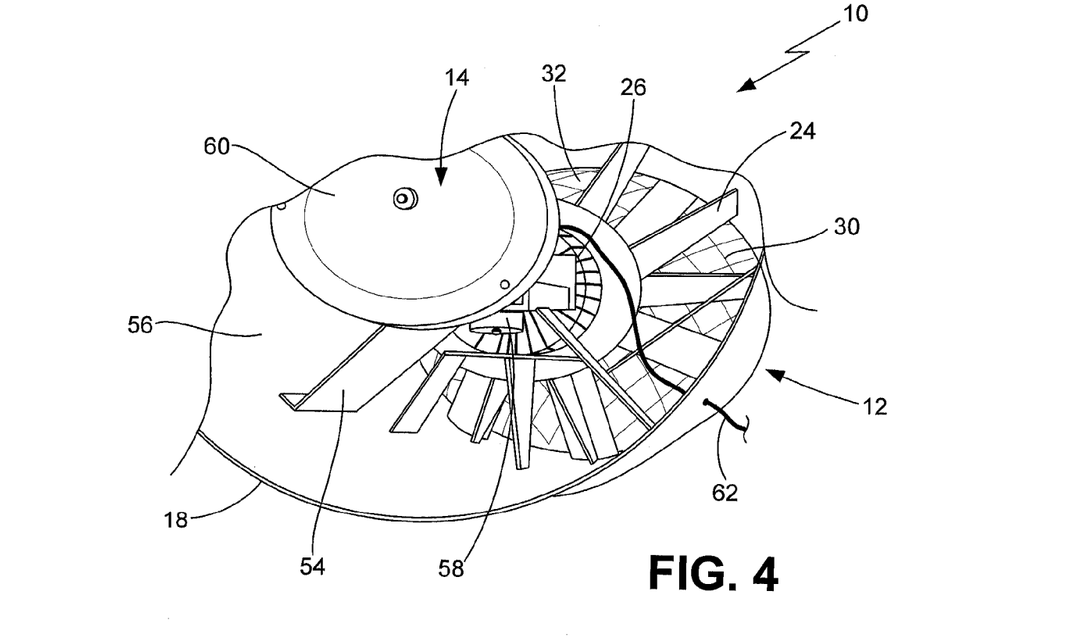
FIG. 4 is a front perspective view of the second or discharge end of the apparatus of FIG. 1.

Preferably, dispersing apparatus 10 will also include tilting mechanism 34, best shown in FIG. 3, that is operatively associated with ducted fan 12 so as to allow the user of dispersing apparatus 10 to vertically direct the discharge end 20 of shroud 18 so as to affect the upward or downward angle of the discharge end 20 and, therefore, the general direction spray mist 16 will travel over the large area 17. In one embodiment, tilting mechanism 34 comprises a lever 36 mounted on shroud 18 that can be manually operated by the user to adjust the vertical tilt or angle of shroud 18 in a manner that directs the spray mist 16 generally upward, downward or horizontally from the discharge end 22 of shroud 18. The tilting mechanism 34 can be configured to tilt the ducted fan 12 relative to a yoke 38 that supports the dispersing apparatus 10 on a support structure, which may be a building, canopy cover or the like or, preferably, a separate carriage or stand 40 such as shown in FIGS. 1 through 3. The stand 40 can include a plurality of frame members 42 that support the ducted fan 12, via yoke 38, above the ground or other surface. In the preferred embodiment, the dispersing apparatus 10 also includes an oscillating mechanism 44, also shown in FIGS. 1 through 3, that is configured to oscillate the ducted fan 12 in a generally left and right direction relative to stand 40 so as to sweep the discharge end 20 of shroud 18 across the large area 17 where the spray mist 16 is generally desired so spray mist 16 will be generally discharged across the large area 17. As known in the art, oscillating mechanism 44 can comprise a motor 46 and a gear assembly 48 that, respectively, provide the power to oscillate the yoke 38, which is attached to and supports the ducted fan 12, and pivotally interconnect yoke 38 to the stand 40, as best shown in FIGS. 1 and 2. Other means of powering oscillating mechanism 44 and pivotally mounting the yoke 38 on stand 40 will be readily apparent to those skilled in the art.

A example of a ducted fan 12 that could be suitable for use with dispersing apparatus 10 of the present invention, depending on the application desired for dispersing apparatus 10, is the Super PoleCat available from SMI (referenced above). Various other high volume fans, whether commercially available or custom made, are likely to be suitable for use as ducted fan 12 for dispersing apparatus 10 of the present invention. In the embodiment shown in FIGS. 1 through 3, the dispersing apparatus 10 also includes an electrical panel 50 attached to stand 40 and an electrical control box 52 attached to yoke 38. Wires 28 interconnect the electrical panel 50 and control box 52 with the fan motor 26 and the motor 46 of oscillating mechanism 44.

Figure 5:
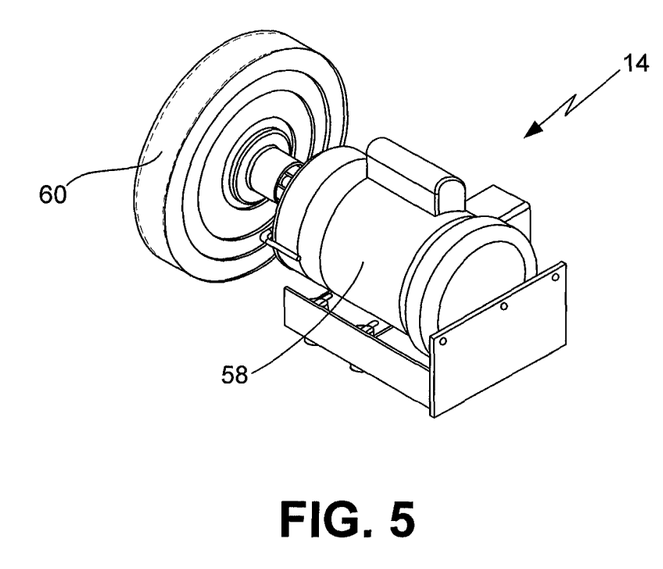
FIG. 5 is a rear perspective view of a rotary atomizer that can be utilized with the dispersing apparatus of the present invention.
Figure 6:
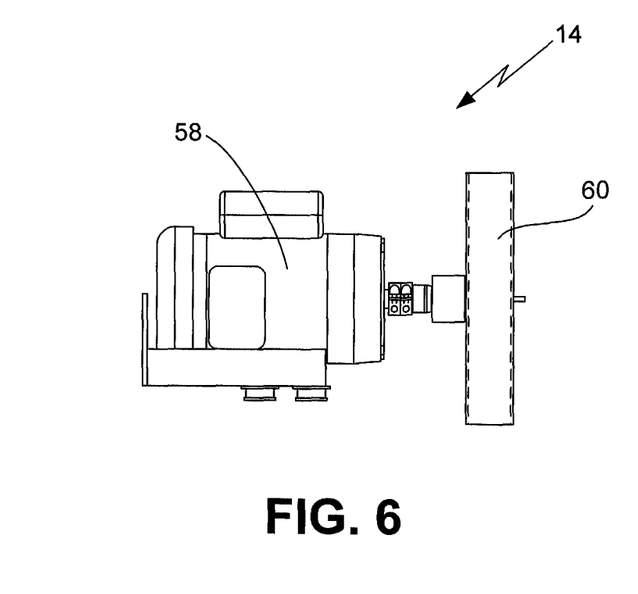
FIG. 6 is a side view of the rotary atomizer of FIG. 3.

In the preferred embodiment of the dispersing apparatus 10 of the present invention, rotary atomizer 14 is mounted inside shroud 18 at or near the discharge end 22 thereof forward of fan blades 24, as shown in FIGS. 1, 3 and 4. The rotary atomizer 14, which is disposed in the air stream 15 created by fan blades 24 of ducted fan 12, is selected to produce a fine mist 16 that can be blown the desired distance by the air stream 15. In a preferred embodiment, the rotary atomizer 14 is mounted inside the shroud 18 with one or more brace members 54 that are sized and configured to dispose the rotary atomizer 14 in spaced apart relation to the inner surface 56 of shroud 18. In one embodiment, best shown in FIGS. 4, 5 and 6, the rotary atomizer 14 comprises an 2 hp electric motor 58, which is also connected to the supply of electrical power via electrical panel 50 and control box 52, and a generally circular-shaped basket 60 that produces a radial spray pattern. Typically, basket 60 can be selected to have either a fine or coarse configuration, or others, for different types of mist 16. A fluid conduit 62, best shown in FIGS. 3 and 4, connects the rotary atomizer 14 to a source of fluid 64, such as the outdoor faucet shown in FIGS. 1 and 2. In one use, the supply of fluid is a conventional low pressure water supply such as is commonly available from most municipalities. As with the ducted fan 12, the motor 58 for the rotary atomizer 14 can be electrically powered, as shown, or it can be a hydraulic motor. In addition to selecting the configuration of the basket 60, the user can also change the particle size produced by rotary atomizer 14 by changing its speed, with a slower speed producing larger droplets and a faster speed producing smaller droplets. Rotary atomizer 14 can have an electrical controller associated with the electrical panel 50 or control box 52 that allows the user to increase or decrease the speed of motor 58 while dispersing apparatus 10 is operating. An example of a commercially available rotary atomizer 14 that is suitable for use with dispersing apparatus 10 is Ledebuhr Industries' twelve inch dual stage rotary atomizer. Other rotary atomizers are also likely to be suitable for the dispersing apparatus 10 of the present invention.

Figure 7:
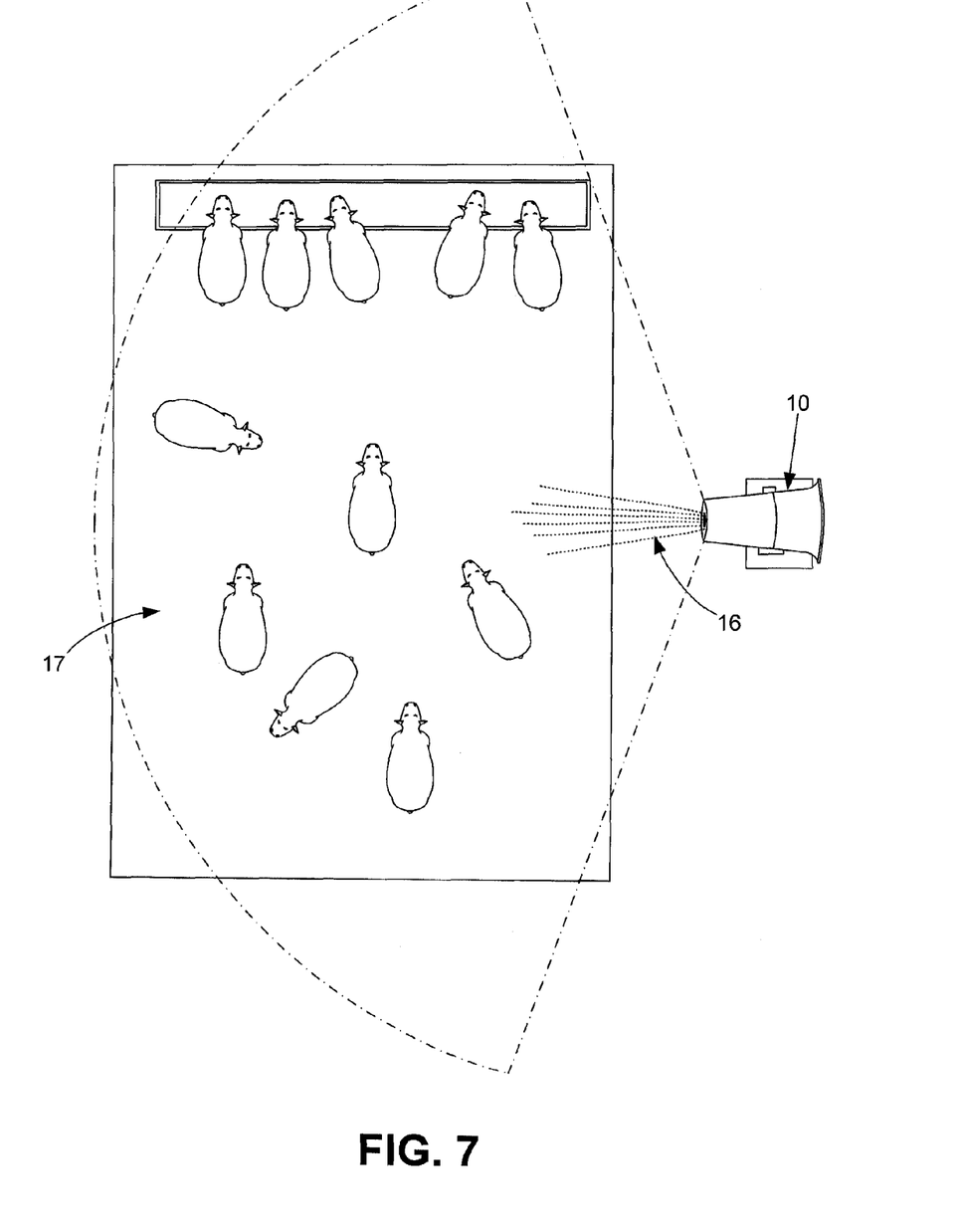
FIG. 7 is a top plan view of a large area having a dispersing apparatus of the present invention being used to cool cattle kept in the area.

The dispersing apparatus 10 of the present invention is particularly useful for cooling the ambient air temperature over a large area, such as the cattle holding area 17 shown in FIG. 17, utilizing water as the substance. The inventor has utilized a pair of such dispersing apparatuses 10 at a dairy facility to cool ten acres approximately five degrees. The dispersing mechanism 10 can also be utilized to cool a large area 17 where people are gathered, such as a concert or an outdoor market, to reduce the temperature in that area 17. In addition, dispersing apparatus 10 can be utilized to cool a relatively large outdoor area 17 where construction workers, farm workers or other people are working. For temporary use, a portable generator can supply the power and a tank can hold the water to be dispersed. Dispersing apparatus 10 can also be utilized to disperse a deodorant, pesticide or antiviral substances (among many others) over a large area 17. The dispersing apparatus 10 can also be utilized to create a fog-like blanket over a crop growing area 17 to keep the crop cool to slow/control growth of the plants for better quality, as is known to be beneficial for alfalfa and certain other crops, particularly in greenhouses and the like. If desired, the dispersing mechanism 10 can also be utilized for fire suppression by dispersing a fire retardant on a large area 17 where a fire is approaching or where it is burning. The dispersing mechanism 10 can also be used on cold and or foggy days to heat a large area 17 and clear the fog to benefit people, animals or plants in the area 17, such as a dairy, vineyard, orchard or the like, by warming the ambient air. Heated air can also be utilized for drying highways and clearing fog on a road to make vehicle travel on the road safer. The substance to be dispersed by dispersing apparatus 10 can be kerosene or other flammable substance that is atomized and then misted out the discharge end 22 of shroud 12 to produce, when lit, a warming flame that is more efficient than present large area heaters due to the atomization of the fuel. As will be readily apparent to those skilled in the art, the materials and/or coatings selected for the various components of dispersing apparatus 10 should be selected for their relative durability, corrosion resistance and long life. If desired, the dispersing mechanism 10 of the present invention can also be utilized to produce snow with less expense and equipment than prior art snow-making systems.

Although the preferred embodiment of the dispersing mechanism 10 does not require a pump or filter there may be uses when such components are required or beneficial. For instance, the user may desire to utilize a pond, lake or other surface water as the source of fluid. This may be particularly beneficial in an emergency to fight a fire. In such circumstances, a low pressure pump will be required to draw fluid from the source and a screen or filter, as may be applicable, should be used to prevent damage to the pump and/or rotary atomizer 14. As set forth above, however, there is generally no need to utilize a high pressure pumps to pressurize the fluid or to use very fine screens or filters to avoid plugging the nozzles of any nozzle-type spraying mechanism (which are not utilized in the dispersing apparatus of the present invention).

In use, a person connects the fan motor 26 of ducted fan 12 and the motor 58 for rotary atomizer 14 to the source of power (e.g., electric or hydraulic) and the conduit 62 to the source of the fluid to be sprayed. The discharge end 22 of shroud 18 is then pointed in the direction of the large area 17 to be affected (e.g., cooled, heated, treated, or etc.). Once the dispersing apparatus 10 is activated, fluid will be atomized by the rotary atomizer 14 and the resulting mist 16 will be blown toward the area 17 by the air stream 15 generated by the ducted fan 12, which can be 55 mph or more. The dispersing mechanism 10 will disperse the mist 16 toward and over the area 17 providing the desired benefits.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to any dimensional relationships set forth herein and modifications in assembly, materials, size, shape and use. For instance, there are numerous components described herein that can be replaced with equivalent functioning components to accomplish the objectives of the present invention.

What is claimed is:

1. A dispersing apparatus for dispersing a spray mist over a large area, comprising:
   a ducted fan having a shroud with an intake end and a discharge end, a plurality of fan blades rotatably disposed in said shroud generally towards said intake end thereof and a motor operatively connected to said fan blades to draw air into said shroud and produce an air stream flowing toward said discharge end, said motor connected to a source of power;
   a rotary atomizer disposed inside said shroud generally towards said discharge end thereof and in fluid flow communication with said air stream, said rotary atomizer having one or more fluid conduits connected to a source of fluid, said rotary atomizer configured to discharge atomized fluid from said source of fluid into said air steam so as to produce said spray mist and discharge said spray mist generally over said large area; and
   means for oscillating said ducted fan operatively connected to said shroud so as to sweep said discharge end of said shroud towards said large area and generally discharge said mist across said large area, said oscillating means comprising a motor connected to said source of power and a gear assembly operatively connected to each of said motor and said ducted fan.

2. The dispersing apparatus of claim 1 further comprising means for tilting said ducted fan operatively connected to said shroud so as to vertically direct said discharge end of said shroud towards said large area and generally discharge said spray mist over said large area.

3. The dispersing apparatus of claim 2, wherein said tilting means has a lever for manual tilting of said ducted fan.

4. The dispersing apparatus of claim 1 further comprising one or more brace members interconnecting said rotary atomizer with an inner surface of said shroud, said one or more brace members configured to dispose said rotary atomizer in spaced apart relation to said inner surface.

5. The dispersing apparatus of claim 1 further comprising a screen at the intake end of said shroud, said screen comprising a plurality of openings to allow said fan blades to draw air into said shroud.

6. A dispersing apparatus for dispersing a spray mist over a large area, comprising:
   a ducted fan having a shroud with an intake end and a discharge end, a plurality of fan blades rotatably disposed in said shroud generally towards said intake end thereof and a motor operatively connected to said fan blades to draw air into said shroud and produce an air stream flowing toward said discharge end, said motor connected to a source of power;
   a rotary atomizer disposed inside said shroud generally towards said discharge end thereof and in fluid flow communication with said air stream, said rotary atomizer having one or more fluid conduits connected to a source of fluid, said rotary atomizer configured to discharge atomized fluid from said source of fluid into said air steam so as to produce said spray mist and discharge said spray mist generally over said large area;
   means for tilting said ducted fan operatively connected to said shroud so as to vertically direct said discharge end of said shroud towards said large area and generally discharge said spray mist over said large area; and
   means for oscillating said ducted fan operatively connected to said shroud so as to sweep said discharge end of said shroud towards said large area and generally discharge said spray mist across said large area, said oscillating means comprising a motor connected to said source of power and a gear assembly operatively connected to each of said motor and said ducted fan.

7. The dispersing apparatus of claim 6, wherein said tilting means has a lever for manual tilting of said ducted fan.

8. The dispersing apparatus of claim 6 further comprising one or more brace members interconnecting said rotary atomizer with an inner surface of said shroud, said one or more brace members configured to dispose said rotary atomizer in spaced apart relation to said inner surface.

9. The dispersing apparatus of claim 6 further comprising a screen at the intake end of said shroud, said screen comprising a plurality of openings to allow said fan blades to draw air into said shroud.

10. A dispersing apparatus for dispersing a spray mist over a large area, comprising:
    a ducted fan having a shroud with an intake end and a discharge end, a plurality of fan blades rotatably disposed in said shroud generally towards said intake end thereof and a motor operatively connected to said fan blades to draw air into said shroud and produce an air stream flowing toward said discharge end, said motor connected to a source of power;
    a screen at the intake end of said shroud, said screen comprising a plurality of openings to allow said fan blades to draw air into said shroud;
    a rotary atomizer disposed inside said shroud generally towards said discharge end thereof and in fluid flow communication with said air stream, said rotary atomizer having one or more fluid conduits connected to a source of fluid, said rotary atomizer configured to discharge atomized fluid from said source of fluid into said air steam so as to produce said spray mist and discharge said spray mist generally over said large area;
    one or more brace members interconnecting said rotary atomizer with an inner surface of said shroud, said one or more brace members configured to dispose said rotary atomizer in spaced apart relation to said inner surface;
    means for tilting said ducted fan operatively connected to said shroud so as to vertically direct said discharge end of said shroud towards said large area and generally discharge said spray mist over said large area; and means for oscillating said ducted fan operatively connected to said shroud so as to sweep said discharge end of said shroud towards said large area and generally discharge said spray mist across said large area.

* * * * *